Figure 1:
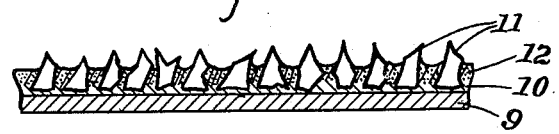

June 15, 1943. N. E. OGLESBY 2,322,156
COATED ABRASIVE
Filed Dec. 30, 1941

INVENTOR:
Nicholas E. Oglesby
BY
Cushman Darby & Cushman
ATTORNEYS.

Patented June 15, 1943

2,322,156

UNITED STATES PATENT OFFICE 2,322,156

COATED ABRASIVE

Nicholas E. Oglesby, Troy, N. Y., assignor to Behr-Manning Corporation, Troy, N. Y., a corporation of Massachusetts Application December 30, 1941, Serial No. 424,998

15 Claims. (Cl. 51—298)

This invention relates to the manufacture of coated abrasives and particularly to the adhesive used in anchoring the abrasive grains to the backing such as a backing of paper, cloth, vulcanized fibre or combination backings made by laminating two or more plies of either similar or dissimilar materials, examples of dissimilar materials being cloth laminated with vulcanized fibre or paper, or paper laminated with vulcanized fibre.

It is an object of the invention to modify and/or control the hardness of organic adhesives used in the manufacture of coated abrasives such as, for instance, glutinous adhesives and synthetic resinous adhesives. It is also an object to improve the heat resistance of such organic bonds. It is a further object of the invention to decrease the percentage of water absorbed or retained by the glutinous adhesives at various relative humidities, and thereby control the expansion and contraction of such glutinous adhesives as, for instance, hide glues, with variations in atmospheric humidity. It is another object of the invention to provide glutinous and resinous adhesives containing inert modifying agents which can be applied to the backing readily in the coating operation, which will subsequently pick up the abrasive grains as desired when they are applied by any of the conventional methods, and which may be readily and smoothly applied over the abrasive grains in the sizing operation.

Certain inorganic adhesives as, for instance, magnesium oxychloride are hard and heat-resistant but cannot be handled successfully in the ordinary sandpaper manufacturing operations. Likewise, certain inorganic adhesives with a sodium silicate base have desirable characteristics of hardness and heat resistance. However, sodium silicate adhesives rapidly deteriorate in ordinary moist atmospheres, especially due to their decomposition by the carbon dioxide of the atmosphere. Furthermore, these inorganic adhesives generally have low shock resistance, i. e. are friable as compared with the organic adhesives of the glutinous and resinous type. It is, therefore, an object of the present invention to provide relatively hard binders from the more tough shock-resistant glutinous and resinous adhesives. This is conveniently accomplished by adding to such adhesives, inert fillers of definite characteristics and in definite quantities as hereinafter set forth.

For severe and relatively hot abrading operations, often encountered in use, the cresol formaldehyde resins have been too thermoplastic as compared with the more heat-resistant phenol-formaldehyde resins. The thermoplasticity of such resins is greatly decreased and their functioning is improved by the use of inert fillers as taught in this invention. Furthermore, hide glues which are otherwise very tough and desirable adhesives lack hardness, heat resistance, and moisture resistance which are conveniently imparted by the use of my fillers. Even the harder and relatively heat-resistant resins, such as the alkali catalyzed phenol-formaldehyde resins, especially those tougher resins of this class having a relatively high ratio of phenol to formaldehyde as, for example, one mol of phenol to one mol of formaldehyde are greatly improved by the use of fillers or modifiers as taught in this invention. For many operations the oil-modified alkyd resins which are tough but soft and lacking in heat resistance are rendered more efficient by the use of inert fillers. Also, varnish type binders made from oil-soluble phenolic resins by cooking them in oil in a varnish-making operation may be improved by the use of inert fillers as taught herein.

Many and in fact most of the inert fillers heretofore used in resins or resinous compositions which are subjected to moulding operations are entirely unsuitable for my purpose. For instance, wood flour is perhaps the most common filler that has been used in moulded phenol-formaldehyde resins. Such a wood filler is entirely unsatisfactory for use in either my modified resinous, modified varnish, or modified glutinous types of adhesives. Such a wood flour filler when used in high percentages with the resinous and glutinous binders commonly used in the manufacture of coated abrasives forms a mixture which cannot be satisfactorily coated. This is especially true where resins and glutinous adhesives, as often is the case, contain water or some other solvent which is readily absorbed by the wood flour. Furthermore, such adhesives containing wood flour, when cured without pressure or a moulding operation, produce a porous, weak and ineffective binder. Likewise, the starches lack heat resistance and when used in large quantities in the glutinous binders and common synthetic resinous binders form adhesives which do not coat well and do not have the final characteristics of density, hardness and heat resistance required. Furthermore, asbestos, cotton or similar fibrous fillers are not efficient for my purposes.

Fillers used in this invention are relatively hard and dense as compared with the organic binders and such fillers as wood flour, are non-porous and non-absorbent of either the adhesive or the solvent used in the adhesive, are inelastic, non-deformable without fracture at normal temperatures, and are inert or relatively non-reactive with respect to the adhesives themselves at the curing or drying temperatures employed and with respect to the catalysts or curing agents added to the resinous or varnish type adhesives when such are used. Furthermore, the fillers used are prepared from relatively common and cheap material since it is a further object of the invention to provide cheap adhesives. A large number of materials serve my purpose well provided they are converted into a form having the correct particle sizes, the correct distribution of particle sizes and the correct particle shapes.

From the foregoing, it will be understood that by the term "inert" as used in the claims it is meant that the filler is substantially non-reactive to the adhesives themselves at the curing and drying temperatures employed or with respect to any contents of the adhesives such as catalysts or curing agents at such temperatures. Similarly, by the term "hard" is meant that the filler is substantially harder than the organic binder with which it is associated. Again, by the term "non-fibrous" as used in the claims I mean to distinguish my filler from fibrous materials such as asbestos or cotton which have been found to be inoperative. By the term "non-absorbent," as used in the claims, is meant that the filler does not appreciably absorb either the adhesive or its solvent, as has been found to be objectionable in the case of wood flour, for example. By the terms "inelastic" and "non-deformable" is meant that the filler exhibits the above-specified characteristics under normal temperatures such as 70° F. By the term "dense" is meant that the filler, as compared with wood flour is relatively free of pores and has a high degree of density.

The fillers used in this invention are not pulverized, that is, they are not of a size associated with dust, since such small particles, when dispersed in my adhesives in the quantities required to accomplish my purpose, do not produce a readily coatable adhesive or an adhesive that flows properly during the coating operation, and especially during the sand sizing operation. In general the average surface diameters of the particles of my fillers range from about 7 or 8 microns to about 28 microns, but in certain cases, for example where heavier or more viscous adhesives which retard settling, are being used, and where the coarser grit coated abrasives are being coated, coarser fillers may be used. It is of course to be understood that my fillers have particle diameters substantially less than the diameter of the abrasive grains to be coated, usually less than one-fourth of the diameter of the abrasive grains. I furthermore find it inadvisable to use fillers with most of the particles of about the same size but prefer to use a filler with variable particle sizes, so that the smaller particles in the solidified adhesives partially fill the spaces between the larger particles of filler.

I have also discovered that the particle shapes of the fillers used are significant. Particle shapes which trend towards the cubical or spherical as distinguished from such shapes as elongated spikes and thin wafers are preferred. Such stronger shaped fillers pack more densely in the adhesive and can be used in a higher percentage by weight or volume to impart greater hardness, greater resistance to heat, and, in the case of glue more resistance to moisture, to the binders.

To accomplish my purposes a relatively high percentage of filler is used in the binder. Preferred compositions of adhesives in the dried state contain from about 35 to about 55 percent by volume of inert filler. Such adhesives are useful as both making coats and sizing coats for coated abrasives. With respect to the quality of the coated abrasive made, it has been found that the filler content of the sizing coat applied over the abrasive grains anchored in the making coat is most important. I often find it desirable to use higher percentages of filler in the sizing coat and may, as a matter of fact, for some purposes, use a smaller percentage of filler in the making coat or even no filler at all. In certain instances the incorporation of high percentages of filler in the making coat may produce a product which has somewhat poorer adhesion between the making coat and the reinforcing backing than a product made without filler in the making coat. For such purposes I therefore produce a highly efficient product by using as a making coat, a binder with less or no filler and as a sizing coat, a binder with a relatively high percentage of filler as, for instance, 35 to 55 percent by volume of filler. However, for many other purposes I prefer to use at least a substantial amount of filler as, for instance, 25 percent by volume or more in the making coat and also a relatively high percentage of filler in the sizing coat, as for instance, 35 to 55 percent by volume. Irrespective of the location of my filler or modifier a composite analysis of all the binder layers generally shows filler or modifier present to the extent of about 25% to about 55% by volume.

Comminuted materials generally sold in the trade which have the required properties of relative hardness, non-porosity and chemical inertness to the binders used under the conditions of use, may have to be re-graded to obtain desirable particle sizes and desirable distributions of particle sizes before use for the purposes of this invention.

I find the average surface diameter a valuable guide in the selection of suitable fillers or modifying agents for the preparation of my adhesives.

Preferably the average surface diameter is not greater than about 28 microns nor less than about 7 or 8 microns, although acceptable results may in certain instances be obtained within an average surface diameter range of about 5.5 to about 6.5 microns to 40 microns, the finer sizes being indicated for use in coating fine grits and the coarser sizes for the coarser grits of coated abrasives. Where the finer fillers are used, it is normally found advisable to use percentages of fillers in my adhesives within the lower ranges of my preferred practice.

Another guide in the control of my fillers is the extent to which coarser or finer particles are present. While in many instances coarser material than that set forth as preferred practice may be present without leading to poor results as compared with results obtained with unmodified adhesives, and while in many instances coarser material may be present in greater quantity than set forth in my preferred practice without leading to similar poor results in the final product, nevertheless the presence of such coarser material in such larger sizes or greater quantities than specified does not contribute substantially to the desirable results that I obtain with my fillers or modifying agents in that such coarse material does not accomplish my purpose of uniform modification of the binder used to hold the abrasive grains. Likewise, in many instances a fairly acceptacle abrasive product as compared with the prior art may be prepared by using finer fillers than those specified or fillers containing a higher percentage of fine material than that specified, but again such fillers are not preferred for producing my superior product in that among other things where excessive fine material is present too much of the organic adhesive is required to wet the excessive filler surface so that insufficient organic adhesive remains to properly anchor the abrasive grains provided such finer fillers are used in sufficient quantity to accomplish my purposes of hardening and otherwise modifying the organic adhesives. Furthermore, such fine fillers, or modifying agents, if used in large quantities, as contemplated by this invention, lead to difficulties in the coating operations, in that when they are combined in high percentages with the preferred organic adhesives, a pasty or somewhat thixotropic adhesive is produced which is not readily coatable and which does not readily pick up the abrasive grains. While the mixtures may be made more coatable by increasing the percent of solvent used in the adhesive mixture, such excessive use of solvent leads to the formation of an adhesive which does not have the desired degree of tack when coated and which, therefore, does not properly pick up and anchor the abrasive grains.

With respect to the limits of coarse material, it is usually preferred that the modifying agents, or fillers, used in this invention pass a 270 mesh screen having a mesh opening of 53 microns, or in most instances that the material pass through a screen with 325 meshes to the linear inch, that is, a screen having a mesh opening of 44 microns. However, acceptable results may sometimes be obtained if not more than 35% by volume or by weight of the modifying agent or filler remains on the said 270 mesh screen, while not less than 65%, by volume or weight, passes the screen. Furthermore it is preferable that the finer not less than 65% passing the screen have an average surface diameter in the range of about 5.5 to 40 microns.

In general I also prefer to use modifying agents or fillers which do not contain more than pared in a liquid medium such as distilled water or alcohol. A pipette is run to the bottom of the tube containing the suspension and the contents are agitated by blowing air through the tube; then the several drops are quickly drawn into the pipette and placed on the microscope slide (50 mm. x 75 mm.). The concentration of the suspension is adjusted so that the resulting dried film on the slide is as thick or crowded as possible and yet each grain is free from contact with others.

One hundred fields or more, according to constancy of results obtained, are examined and each particle in a field is measured. The observations consist of the total number of particles and the size of each individual particle. The diameter of a particle is determined by means of a filar micrometer containing a net ruled eyepiece by means of which the boundaries of the field are defined. The filar micrometer is calibrated against a stage micrometer.

In determining the diameter of a spherical particle no difficulty arises but if the particle is not spherical then either the three dimensions are measured from which an average diameter is calculated or preferably the "Martin's diameter" is determined. "Martin's diameter" may be defined as the distance between the opposite sides of the particle, measured crosswise of the field and on a line bisecting the projected area of the particle.

The average surface diameter is calculated from the equation $$d_{ave.} = \frac{\text{Sigma } nd^3}{\text{Sigma } nd^2}$$

as illustrated in Table 1 below.

The average diameter as calculated from the above equation is a linear dimension independent of weight and specific gravity and may be considered to be the average particle size with respect to surface.

The particles as illustrated in Table 1 are also grouped into various size ranges and the percent by weight or by volume is calculated for each size or size range by the formula $$\frac{nd^3}{\text{Sigma } nd^3}$$

Table 1

| Range of particle diameters | $n$ | $d^3$ | $nd^3$ | Per cent by wt. or vol. | $d^2$ | $nd^2$ |
|---|---|---|---|---|---|---|
| 0–1.0 | 6,672 | .125 | 834 | .01 | .25 | 166 |
| 1–2 | 5,970 | 3.375 | 20,150 | .33 | 2.25 | 13,430 |
| 2–4 | 2,750 | 27 | 74,300 | 1.21 | 9.0 | 24,750 |
| 4–7 | 1,536 | 166.4 | 255,800 | 4.15 | 30.25 | 46,500 |
| 7–10 | 636 | 614.25 | 391,000 | 6.35 | 72.25 | 46,000 |
| 10–15 | 304 | 1,953 | 594,000 | 9.65 | 159 | 48,400 |
| 15–20 | 247 | 5,359 | 1,330,000 | 21.6 | 306.2 | 75,550 |
| 21–21 | 113 | 9,261 | 1,046,000 | 17.0 | 441 | 49,500 |
| 31–31 | 23 | 29,791 | 685,000 | 11.1 | 961 | 22,180 |
| 42–42 | 21 | 74,088 | 1,557,000 | 25.25 | 1,764 | 37,050 |
| 59–59 | 1 | 205,379 | 205,379 | 3.34 | 3,481 | 3,481 |
| Sigma $n=$ | 18,273 | Sigma $nd^3=$ | 6,159,436 | | Sigma $nd^2=$ | 321,007 |

$$\frac{\text{Sigma } nd^3}{\text{Sigma } nd^2} = \frac{6,159,436}{321,007} = 19.2 \text{ microns}$$

12% by volume or by weight of particles having a diameter below two microns.

Where the terms "diameter," "average surface diameter" or "percent by weight or by volume" are used herein, it is contemplated that the numerical values for such terms will be evaluated as set forth herein.

To determine the numbers and diameters of the particles, a suspension of the filler is pre- In Table 1 above, $d=$ the average of the range of particle diameters or the particle diameter at the size stated where no range is given, in microns.

Similarly $n=$ the number of particles under consideration either at the specified diameter or within the range of specified diameters.

Table 1 has deliberately been shortened by using ranges of considerable magnitudes. In practice it is often desirable to use a smaller interval or range of particle sizes and thereby obtain greater accuracy in the results obtained for the percentages by volume or weight or the average surface diameter.

Table 1 represents actual data obtained from the examination of a filler or modifier consisting of calcium carbonate in the form of a pure limestone which has been found very satisfactory for my purposes.

Many other materials having similar particles sizes, shapes and distribution of sizes are also satisfactory for our purposes; as for instance, a mixture of about 85% quartz and 15% glass sold in the trade under the name of "Gartex" and having average surface diameter of 23 microns is highly satisfactory from the standpoints of operation of the process and desirable abrasive qualities in the final product. However, due to a slight hazard of silicosis from finely divided silica generated in grinding with an abrasive device involving the use of this filler or modifier in the adhesive, it is not preferred.

Highly satisfactory results have been obtained by using modifiers consisting of fused aluminum oxide, garnet, marble, and many other materials including, in some cases, a few very special clays, provided the particle shapes, sizes, and distribution of particle sizes are as specified herein and provided that the materials in question are reasonably hard, dense and non-reactive with either the adhesive, the solvent, or the catalyst used in curing the adhesive under the conditions of coating and drying or curing the abrasive article.

It is also to be understood that the fillers in question should not decompose under the conditions of coating or curing the binder subsequent to the coating operation, as for instance, gypsum, $CaSO_4.2H_2O$, may be obtained or prepared so as to have the desired particle size, shape and distribution of sizes. When, however, such a material is used in a phenol-formaldehyde resin binder requiring a high temperature, e. g. 300° F. for its curing, during the advanced stages of the curing operation after the resin has been partially cured and is relatively immobile, water is given off from this hydrated body with the result that steam pockets are formed in the adhesive, leading to a porous, weak and ineffective final form of the adhesive.

As typical of fillers that react with certain catalysts, I cite as an example, zinc oxide used as a modifying agent or filler in a phenol-formaldehyde resin catalyzed with sodium hydroxide. Furthermore, highly alkaline fillers added to such resins make them too reactive, while acid fillers in general destroy the alkaline catalyst already present.

As a further illustration of the care that must be exercised in obtaining or preparing modifiers or fillers with the correct particle size, relative freedom from extremely fine material, and correct average surface diameter, it is pointed out that the calcium carbonate referred to in Table 1 as well as the "Gartex" hereinbefore referred to, are rendered generally ineffective for my purposes by continued grinding in a ball mill to a point where the average surface diameter approaches about 5½ microns.

Where reference is made to passing the modifying agents or fillers through screens to determine the extent of the presence of coarse particles, it is intended that the screening operation will be carried out wet as otherwise small particles will be lost into the air, the screening will be inefficient due to agglomeration of the small particles, and the large particles remaining on top of the screen will have attached thereto, many small particles which can be removed by washing in a wet operation.

Heretofore coated abrasives made with a hide glue binder have been subject to what is known as deterioration, especially unless stored under ideal conditions of humidity. This deterioration is most severe in the case of the coarser grits. It is presumed to occur as a result of contraction and/or expansion of the adhesive with changes in atmospheric humidity, i. e. changes in the water content of the glutinous adhesive. The net result is that the adhesive separates from the abrasive grains to an extent that it no longer holds them with sufficient tenacity to give satisfactory abrading action in normal use. It is an unexpected result of the present invention that such deterioration is substantially retarded, if not eliminated, by the incorporation of high percentages of fillers or modifiers in the glutinous adhesive as taught in this invention. It is believed that this desirable result is brought about by the decrease in contraction and/or expansion of the adhesive with changes in atmospheric moisture. It has been found by experiment that the decrease in expansion and/or contraction incident to the use of these fillers or modifying agents is greater than would be anticipated on the basis of additive properties. In other words, for example, an adhesive in the finally dried form consisting of 50% by volume of filler and 50% by volume of dry glue has a coefficient of expansion and/or contraction of less than one-half of that of the same dry glue used in unmodified form.

It is another unanticipated result of the present invention that when my inert fillers or modifiers are combined with glutinous adhesives or resins of the type heretofore used in making coated abrasives which are flexed by mechanically breaking the adhesive in a flexing operation, that my new products are more flexible after the mechanical flexing operation than the products of the prior art, rather than less flexible. This is presumed to result from the fillers or modifying agents making the adhesive-abrasive layer somewhat more brittle at the same time that it increases the hardness of the adhesive compositions. This invention therefore permits the manufacture of flexible coated abrasives with harder and more inflexible binders than have heretofore been used.

In the accompanying drawing, I have illustrated my improved sandpaper which may be made up in the form of flat sheets or as special articles such as discs.

Figure 2:
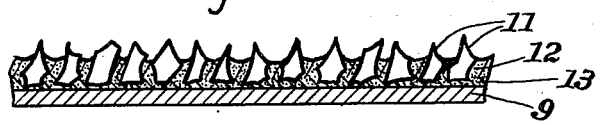

Referring to the drawing,

Figure 1 is a cross-sectional view of one type of coated abrasive made in accordance with this invention; and Figure 2 is a cross-sectional view of another type of coated abrasive made in accordance with this invention.

Referring to Figures 1 and 2, 9 is a coated abrasive backing and may consist of paper, cloth, vulcanized fibre, or a combination consisting of laminations of cloth with either paper or vulcanized fibre.

Referring to Figure 1, 10 is a making coat of abrasive grit-adhesive such as a making coat of hide glue or a making coat of synthetic resin. The making coat 10 of adhesive is not shown as modified with one of the inert fillers taught in this invention.

Referring to Figure 2, 13 is a making coat of abrasive-grit-adhesive, as, for example, a making coat consisting of hide glue or a making coat of synthetic resin. The making coat of adhesive 13 is shown modified with comminuted fillers as taught in this invention.

Referring to Figures 1 and 2, 12 is a sand sizing coat of abrasive-grit adhesive as, for example, a sand sizing coat comprising hide glue or synthetic resin applied over the abrasive grains 11 after they have been anchored by the making coats of adhesive. The sizing coat of adhesive 12 of both Figures 1 and 2 is modified with inert fillers, as taught in this invention, to produce the improved coated abrasive article.

*Coated abrasive Example 1*

As one illustration of the use of my process, I will cite the manufacture of sanding discs adapted for use on a yielding supporting pad on which the discs are secured at the center only.

A. In this case it is desired to produce a highly water-resistant disc as well as one that resists high temperatures, and is free-cutting.

A suitable organic adhesive is a phenol-formaldehyde resin made as follows:

Heat together to 100–110° C. while stirring phenol, 100 parts by weight and sodium hydroxide (solid) .86 part by weight, and hold at 100–110° C. for 15 minutes to dissolve the sodium hydroxide. Then cool to 50° C. and add slowly while stirring, paraformaldehyde, 30 parts by weight.

Apply a slight vacuum (about ½" to 1") and raise the temperature slowly over one to one and one-quarter hours to 100° C. Raise vacuum to 10–15" until temperature is about 70° C. Hold at this temperature under vacuum until cooled sample shows desired viscosity. Then cool to 35° C.

A desirable viscosity for our purpose is 17.6 poises at 25° C. The resin should have a solids content, as determined by usual methods of curing, of about 79%, and the water content, as determined by the Karl Fischer method, will be about 9–10%. Likewise, the pH will be about 8.5 to 9 or can be adjusted to this value.

A suitable filler for use in preparing my adhesive is the calcium carbonate described in Table I.

In preparing the making coat of adhesive, the filler, in amount sufficient to give a dry adhesive after the curing operation, of 50% by volume of filler and 50% by volume of dry resin, is first wetted with water and then thoroughly stirred into the resin. For instance, 18 lbs. of filler is thoroughly wetted with 4 lbs. of water, and the paste so formed is stirred into 12 lbs. of the resin made as described above, and containing 79% solids. The mixing operation is carried out at ordinary temperatures.

A suitable backing for the sanding discs in question is vulcanized fibre, weighing 62.4 lbs. per sandpaper ream, or a lamination of drills cloth held to 10 mil vulcanized fibre by a partially cured or preferably a cured binder of synthetic resin, as for instance, phenol-formaldehyde resin.

In the coating operation the heavy fibre weighing 62.4 lbs. per ream, for instance, is passed through a conventional sandpaper making machine and a coating of the resinous-filler or modified adhesive prepared as just described is applied to the backing by conventional calender rolls. A suitable temperature for the application of the making coat of adhesive is 95–100° F. and a suitable wet weight of the making coat of modified adhesive is 12–14 lbs. per sandpaper ream, for the particular example in question. After the adhesive is applied to the backing, the backing is passed by or through a conventional sand-applying means in which a coating of grit #36 fused aluminum oxide abrasive grains is added. A suitable weight of the abrasive grains is 59–64 lbs. of abrasive per sandpaper ream.

The web is then passed to conventional drying means wherein the resin is partially cured by a progressively rising temperature since complete curing at his stage may make this web brittle and difficult to remove from the conventional sandpaper drying room. The curing is carried to a point that the grains are sufficiently anchored, as for instance, a partial curing cycle as follows is carried out.

| | Hours |
|---|---|
| 110° F | 1 |
| 130° F | 1 |
| 160° F | 1 |

It will be noted that the partial curing cycle is relatively rapid in this case. This fast curing cycle is possible because the filler prevents the excessive flow of the adhesive or dislocation of the grains which has heretofore occurred with fast curing cycles where similar resins have been used but without such use of fillers or modifiers. In case any flow is encountered it may of course be avoided by slowing down the rate of temperature rise. The web is then passed from the drying means to a sand sizing machine and a sizing coat of modified adhesive is applied over the grains.

A suitable sizing adhesive is the adhesive previously described for the making coat provided it is applied at a temperature of 110–115° F. so as to provide a lower viscosity. Likewise, the same adhesive may be thinned with alcohol or water and applied at a lower temperature. After the sizing operation, which is carried out in the conventional way on a conventional machine, the coated web is passed to a conventional drying means where it is again partially cured in the form of festoons, as for example by a cycle consisting of:

| | ° F. |
|---|---|
| 1 hour | 110 |
| 1 hour | 130 |
| 3 hours | 150 |

Again it will be noted that a relatively rapid cure is possible because of the retarding of flow, that would otherwise occur with such resins, by the filler or modifying agent used in the adhesive. After this curing operation the coated web is removed from the racks in the form of a roll and the final curing operation is carried out by blowing hot air through the roll. In this final curing operation hot air is blown through the roll at a rapid rate for the times and at the temperatures which follow:

| | ° F. |
|---|---|
| 1 hour | 160 |
| 1 hour | 180 |
| 1 hour | 190 |
| 1 hour | 205 |
| 1 hour | 220 |
| 2 hours | 300 |

The finished roll of goods may then be cut into discs, sheets, drum covers, or other forms in which it is desired to use the coated abrasive.

B. In this case instead of using a making coat of the resin and filler a making coat of phenol-formaldehyde resin without filler is used as set forth in U. S. Patent No. 2,184,896 issued to Nicholas E. Oglesby on December 26, 1939. After the making coat of adhesive and the abrasive grains are applied and the making coat has been cured as mentioned in the aforesaid Oglesby patent the goods may be passed to a conventional sandpaper sizing machine where the sizing coat described under "A" above is applied. Subsequently the goods are handled as described under "A" above. In some instances this latter practice is preferred in that the sizing coat applied over the abrasive grains has the desired hardness and resistance to heat and in that the making coat of adhesive without the modifying agent may be protected by the sizing coat, and especially since in some instances the unmodified adhesive adheres to the backing somewhat better than the modified adhesive. However, in many cases this is not the case and it is desired to modify both the making and sizing coats as illustrated in Example 1—A.

In lieu of the phenol-formaldehyde resins other resins may be used, as for instance, the cresol-formaldehyde resins which are more thermoplastic than the phenol-formaldehyde resins and in unmodified form make less satisfactory abrasive articles. It has been found that uses of fillers as taught herein overcome at least a substantial part of the undesirable characteristic of thermoplasticity of this class of resins.

In lieu of the calcium carbonate above described, a highly satisfactory abrasive disc may be made for instance by using the Gartex modifier or filler hereinbefore described.

Likewise, a very satisfactory disc has been made by using as the adhesive a mixture of the phenol-aldehyde resin above described with a modifying agent consisting of #400 fused aluminum oxide abrasive. While there is a considerable variation in the size of the #400 aluminum oxide abrasive grains, the variation in sizes is not at the optimum and furthermore unless special means for preparing the grains are used they may not approach the optimum shape as closely as many other modifiers or fillers. For this reason adhesives consisting of 50% by volume of #400 fused aluminum oxide and 50% by volume of resin solids have not been found as satisfactory as an adhesive containing 40% by volume of the filler and 60% by volume of resin solids. Such an adhesive may be made up by wetting 15.5 lbs. of #400 fused aluminum oxide abrasive grains with 3 lbs. of water and then adding the grain so wetted to 12 lbs. of the resin containing 79% solids and thoroughly mixing.

*Coated abrasive Example 2*

Efficient sanding discs, drum covers and the like, where a high degree of water resistance is not essential, may be more simply made by using my modified hide glue adhesives, in which a good grade of hide glue is modified with reasonably hard, dense, non-absorbent, inert fillers provided such inert fillers or modifiers have particle sizes and size distributions as hereinbefore described and such fillers, for example, may consist of such materials as barytes, garnet, Gartex, calcium phosphate, calcium carbonate, and many other materials. In this case a suitable backing is a drills cloth held to a 10 mil vulcanized fibre by a hide glue adhesive. The coating is preferably applied to the cloth side of the combination.

For example, grit #24 fibre backed discs may be made as follows:

The making coat of adhesive is prepared by making up a 50% glue solution of, for instance, an 86 millipoise hide glue, taking 10 lbs. of this solution and stirring into it, 18 lbs. of barytes wet with 4 lbs. of water. The mixing may be carried out conveniently at 140–160° F. to prevent gelling of the glue. It is to be understood that the hide glue, sometimes called dry glue, used in making the solution is glue as is normally sold in the trade and that it actually contains about 12.5% water. The barytes particles used in making and sizing adhesives of this example had an average surface diameter of 17.7 microns.

The fibre combination backing previously described is passed through a conventional sandpaper machine and a making coat of adhesive prepared as just described is applied thereto by conventional sandpaper making machine calender rolls. In this particular case the wet weight of the adhesive applied to the backing may be about 15 lbs. per sandpaper ream. After the making coat of adhesive is applied, the adhesively coated web is passed by or through a conventional sand-applying means and a coating of grit #24 fused aluminum oxide abrasive grains is applied. A suitable weight of abrasive grains is 93–97 lbs. per sandpaper ream. Subsequently the web is partially dried, as is customary in the manufacture of glue bond sandpaper, between the making and sizing machine after which the web is passed through a conventional sandpaper sizing machine and a coat of sand size is added. A suitable sand sizing solution may be made by mixing into 10 lbs. of the 50% glue solution 18 lbs of barytes wet with 9 lbs. of water, the temperature of mixing being as before, from 140–160° F. A suitable temperature for the application of the sand size is 155° F. A suitable weight of the wet sizing adhesive above described is about 19 lbs. per sandpaper ream. Heavier or lighter sizes may be used in accordance with the severity of the abrading operation upon which the disc is to be used. The coated web is now passed to a conventional sandpaper drying means, dried, taken down and cut up into discs, drum covers, or other forms in the way that ordinary glue bond sandpaper is handled.

For many purposes a preferred product can be made by varying the foregoing procedure so that instead of my modified making coat an unmodified 50% hide glue solution is used as the making coat in accordance with the present standard practice and the modified size described above is applied in the manner and to the extent described. The sizing coat gives the hardness and heat resistance desired for some purposes to the abrasive-binder coating and sometimes the use therewith of unmodified glue as a making coat gives greater adhesion between the cloth of the combination backing and the making coat of adhesive. This is because the modifiers or fillers, when used in the making coat, may limit the penetration of the glue into the cloth.

For some purposes, a highly satisfactory coated abrasive has sometimes been made in the past by coating the backing with an adhesive consisting of hide glue, then adding about 25% to 40% of the abrasive grain coating, drying, taking down and again passing the web through the making machine where a second making coat of glue is added over the grains already anchored in place, passing the web through a sand-applying means a second time and adding the balance of the abrasive grain coating after which a sand sizing coat is added over the complete abrasive coating. Such a process is well adapted for use with our modified adhesives and we have used from 0 to 50% by volume (dry basis) of modifier or filler in the first making coat with good success. Preferably subsequent coats, that is, the second making coat and the sand sizing coat have my modifying agents incorporated therein to the extent of from 35–55% by volume of the dried adhesive.

*Coated abrasive Example 3*

30 silicon carbide paper is a coated abrasive having many applications but this product is particularly useful in the floor sanding trade. A suitable backing for this product is 130 lb. rope cylinder paper. A suitable making coat of adhesive is one consisting of 80 lbs. of dry glue, 162 lbs. of calcium carbonate (as described in Table 1) and 150 lbs. of water. This adhesive may be prepared and mixed as previously described for similar compositions. A satisfactory sizing coat of adhesive is 120 lbs. of dry glue, 244 lbs. of calcium carbonate filler (as described in Table 1) and 299 lbs. of water. The adhesive is mixed as previously described. A suitable abrasive is #30 silicon carbide graded to coated abrasive standards. The paper backing is run through a conventional sandpaper machine where about 8.4 lbs. per sandpaper ream, wet weight, of the making coat of adhesive is applied at a temperature of about 155° F. after which about 57 lbs. per sandpaper ream of the abrasive grains are applied in the conventional manner. After partial drying of the web the sizing coat just described is applied at a temperature of 155° F., a wet weight of the sizing adhesive of about 11 lbs. per sandpaper ream being generally satisfactory. However, heavier or lighter sizes may be used, according to the intended uses of the product. Similarly, a suitable #30 silicon carbide paper has been prepared by using other modifiers or fillers such as Gartex, garnet or slate of the specified particle size and distribution.

The finished product is useful in making abrasive sheets, discs, drum covers, belts and other forms or shapes of coated abrasives.

The formulas illustrated above for #30 silicon carbide contemplate the use of 50% by volume of filler and 50% by volume of dry glue as the final adhesive film. Satisfactory results have also been obtained by using as low as about 35% by volume of filler in the sizing coat and from 0 to 50% by volume of filler in the making coat of adhesive. However, I prefer to use a relatively high percentage of filler, at least in the sizing coat of adhesive, and aside from the quality of the product it is economical to use the cheap modifiers or fillers in the making coat of adhesive.

*Coated abrasive Example 4*

A popular and much used grade of coated abrasive is #80 silicon carbide or fused aluminous oxide paper. My process is well adapted for use in making this type of coated abrasive. A suitable backing and the backing normally used in making this product is 130 lb. rope cylinder paper. I have used successfully as a making coat of adhesive, an adhesive consisting of 5 lbs. of dry glue, 10.5 lbs. of calcium carbonate (described in Table 1) and 10.5 lbs. of water. The adhesive is mixed by first wetting the calcium carbonate (preferably of a grade described in Table 1) with part of the water and then stirring it into a 50% glue solution containing the balance of the water. A satisfactory sizing coat of adhesive consists of 5 lbs. of dry glue, 10.5 lbs. of calcium carbonate and 14.25 lbs. of water, the mixing being carried out as above described. A suitable abrasive is #80 silicon carbide abrasive grains normally used in making sandpaper. The paper backing is run through the conventional sandpaper machine and a suitable making coat of the foregoing composition is applied at a temperature of 155° F. A suitable wet weight of the making adhesive is 5.4 lbs. per sandpaper ream. After the making coat of adhesive is applied, about 20.6 lbs. per sandpaper ream of the abrasive grains are applied in a conventional manner. After partial drying of the web the sizing coat above described is applied at a temperature of 155° F., a wet weight of the sizing adhesive of about 7 lbs. per sandpaper ream being generally satisfactory. However, heavier or lighter coats of sizing may be added according to the intended uses of the product. Similarly, a suitable #80 silicon carbide paper has been prepared by using in lieu of the calcium carbonate, other modifiers or fillers such as Gartex, garnet, barytes, or slate of the specified particle size and distribution. It will be apparent to those skilled in the art that many other materials may be used to prepare suitable fillers or modifiers for the adhesive and that mixtures of suitable fillers may be used in lieu of a single filler.

The example above illustrates the use of 50% by volume of fillers and 50% by volume of dry glue in the dry adhesive composition. Results satisfactory for many uses have also been obtained by using as low as about 35% by volume (dry basis) filler in the sizing coat and from 0 to 50% filler by volume (dry basis) in the making coat of adhesive. However, I prefer to use a relatively high percentage of filler, at least in the sizing coat of adhesive, and aside from the quality of the product it is economical to use cheap modifiers or fillers in the making coat of adhesive. In many instances the use of fillers in the making coat produces a superior product but in other instances and for specific applications the omission of at least a high percentage of the filler or modifier in the making coat is an advantage in that the unmodified making coat may adhere somewhat more tenaciously to the backing, while the sizing coat alone provides the hardness and heat resistance required for free cutting abrasive action in use. It is of course to be understood that coated abrasives are used under a variety of conditions and for various purposes. For some applications greater overall hardness of the binder is required than for other applications. Furthermore, some applications require more tenacious union of the making adhesive with the backing than others. It will thus be apparent that there is a wide demand for the products made in accordance with this invention in which fillers or modifiers are used in both the making and sizing coats as well as the products made in accordance with this invention in which the fillers or modifying agents are used in the sizing coats only.

The product of this example is useful in making sheets, discs, drum covers, belts and other forms of coated abrasives.

Coated abrasive Example 5

A highly efficient #80 silicon carbide or fused aluminous oxide paper has also been made, using a modified resinous type of adhesive. A suitable backing for use in making, for example, #80 aluminous oxide paper with this type of binder is 130 lb. rope cylinder paper. I have used successfully as a making coat of adhesive, a composition consisting of 10 lbs. of the resin made as described under Coated abrasive Example 1, 15.75 lbs. of calcium carbonate as described in Table 1, 3.5 lbs. of water and 1 lb. of ethyl alcohol. The alcohol is added to the resin and the calcium carbonate is wetted with the water and the latter paste is then stirred into the resin solution at ordinary temperatures. Similarly, a satisfactory sand sizing adhesive may be prepared by using 8 lbs. of the same resin, 12.5 lbs. of the same filler, 3.5 lbs. of water and 2 lbs. of ethyl alcohol. A satisfactory abrasive is the #80 fused aluminous oxide used in making conventional sandpaper. However, various other fillers or mixtures thereof, with suitable characteristics as specified herein may be used.

The paper backing is run through a conventional sandpaper machine and a wet weight of 8.6 lbs. of the making coat of adhesive per sandpaper ream is applied to the backing at a temperature of 120° F. A suitable coat, i. e. about 21.4 lbs. per sandpaper ream of the fused aluminous oxide abrasive grains is added by conventional means and the coated web is then passed to a drying and curing room where the following curing cycle is carried out:

|  | ° F. |
|---|---|
| 1 hour | 110 |
| 2 hours | 130 |
| 1 hour | 150 |
| 1 hour | 160 |
| 1 hour | 190 |
| ½ hour | 270 |

The goods are then passed from the drying room to a sandpaper sizing machine where a wet weight of sizing adhesive of about 9 lbs. per sandpaper ream is added at a temperature of 130° F. However, heavier or lighter sizes may be applied in accordance with the intended use of the product. The goods are then again passed to drying or curing means such as is used in the sandpaper industry and the following curing cycle is carried out:

|  | ° F. |
|---|---|
| 1 hour | 110 |
| 1 hour | 120 |
| 2 hours | 130 |
| 2 hours | 150 |
| 1 hour | 180 |
| 1 hour | 190 |
| 1 hour | 205 |
| 1 hour | 220 |
| 2 hours | 300 |

The cured goods are then removed from the curing means, are preferably humidified to soften the backing, and may be flexed or not flexed before cutting into the forms and shapes in which it is desired to use the product. Such a product is often used in the form of belts, drum covers, or discs as well as in other forms.

If it is desired to use the foregoing product for a wet or water lubricated sanding operation the backside of the paper should be waterproofed with china wood oil or backsizing varnishes, or other materials well known in the art and often used in making waterproof sandpaper.

This example illustrates the employment of making and sizing adhesives which in the finally cured state contain 50% by volume of inert filler and 50% by volume of resin solids. As previously explained, and for similar reasons to those set forth heretofore, this practice is modified as occasion demands, the said modifications consisting of products in which the dried making coat of adhesive has a filler content varying from 0 to 50% by volume, while the dried sizing coat of adhesive has a filler content of 35 to 55% by volume.

The processes and products described herein, in which a glutinous adhesive or binder for the grains is modified with an inert filler, are advantageously combined with a tanning process in which the glutinous component of the adhesive is rendered more resistant to moisture or water and in many cases to heat.

It has often been proposed in the prior art to tan the glutinous adhesive used to hold the abrasive grains to a reinforcing backing in coated abrasives. However, these tanning or insolubilizing processes of the prior art have not been generally successful. In the prior art methods it has often been proposed to mix the tanning agent with a solution of glutinous adhesive before it is applied as a making coat or sizing coat in the manufacture of coated abrasives. Where this is done, the most efficient tanning agents in general, such as for example formaldehyde or paraformaldehyde, have been found to change the viscosity of the solution too rapidly and to render the same uncoatable or difficult to coat in too short a time. Other methods of the prior art have involved the application to the coated abrasive after its fabrication of an aqueous solution of the tanning agent, as for instance an aqueous solution of formaldehyde. This method of tanning, especially in the case of all except the very finest grits of coated abrasives, has resulted in loss of adhesion between the binder and the abrasive grains. In other words, after such a tanning operation the glutinous binder does not hold the grains with the tenacity required for most abrading operations. I have discovered that this tanning operation may be carried out without injuring the adhesion between the binder and the abrasive grains provided the coated abrasive is not wetted with water or other solvent which swells the glue and necessitates a shrinkage in the subsequent drying out of the glutinous adhesive.

Successful tanning of the glutinous constituent of my binders without loss of adhesion between grains and adhesive, may be accomplished by exposing the coated abrasive, after its fabrication, to formaldehyde vapors. Products made as described herein by combining inert modifiers and hide glue to provide a superior modified abrasive binder have been rendered more water resistant and also in many instances more effective in dry abrading operations by exposing the fabricated products to the fumes of formaldehyde vapors for such times and in such concentrations as is required to impart water resistance to the glutinous adhesive, it being understood that the times and concentration will vary somewhat with the thickness of the adhesive film which it is desired to tan or insolubilize.

Alternately I may tan the finished products by applying thereto a solution of the tanning agent, as for instance formaldehyde or paraformaldehyde, in a solvent which is immiscible with glue. The important consideration is that in the tanning operation the hide glue be not swelled, dissolved or otherwise deleteriously changed by the solvent used to carry otherwise desirable tanning agents, as for instance formaldehyde or paraformaldehyde.

In the manufacture of sandpaper, particularly glue bond sandpaper, it has been customary to use a brush after the making coat of adhesive is applied to smoothen the adhesive film and remove the ridges that usually are found in the film applied by calender rolls. In carrying out my processes I contemplate using brushes as required on my modified adhesive of both the glutinous and resinous types. Furthermore, since my modifying agents incorporated with organic binders produce adhesive mixtures which are less flowable, I often find it advantageous to use superheated steam to flow out the ridges in the making coat of adhesive, either prior to the application of the abrasive grains or concurrently therewith, and to drop the sizing coat of adhesive well down among the abrasive grains by using superheated steam concurrently with the application of the sizing coat by surrounding the calender sizing operation or other means of applying size with an atmosphere consisting of or containing a substantial amount of solvent vapor as disclosed in U. S. application Serial No. 659,565 filed by Nicholas E. Oglesby on March 3, 1933. Likewise, I contemplate using the special sizing methods described in Oglesby application, Serial No. 397,299 filed June 9, 1941. The latter method is particularly advantageous in placing the sizing coat well down among the grains and causing the modified binder to form a superior bond with the abrasive grains, while at the same time avoiding loss of orientation previously imparted to the abrasive grains or improving the said orientation as explained in detail in the said Oglesby application.

In making up the various adhesive compositions contemplated for use in this invention, it is sometimes advantageous to use well known wetting agents as an aid to wetting the fillers or modifiers with water in forming a paste, which is subsequently stirred into the organic adhesive. In addition to other well known wetting agents, a small amount of glue may be added to the water used to wet the fillers or modifiers, especially where the paste is intended to be mixed with the glutinous adhesive. However, such use of wetting agents is a matter of convenience or expediency and not a necessity.

Among other advantages in products made by this invention, it has been found that they are relatively non-loading in use, as compared with the products of the prior art. This is particularly true of the products made with my modified hide glue adhesives. It is believed that this desirable characteristic is the result of the greater resistance of the adhesives to heat. That is, the adhesives do not become sufficiently tacky or thermoplastic at grinding temperatures to anchor onto and among the grains the debris formed in the abrading operation.

The present specification has given directions for making up my modified adhesives, in which the modifiers are added to the liquid adhesive. Where the basic organic adhesive material is in solid form and is brought into solution by a solvent and/or the application of heat for the coating operation, it will be found more convenient to add the fillers or modifying agents as part of the prepaartion of the solid adhesive. For example, hide glue is normally extracted from the glue stock by water and concentrated by vacuum evaporation after which the concentrated glue solution is dried, for example, in the form of films, and then ground to a suitable state of subdivision. The fillers or modifiers of the present invention may conveniently be added to the glue solution before the drying of the solution to form the solid adhesive. After the fillers or modifiers are incorporated in the solution, the solution may be dried in the customary way to form films, sheets or other desirable forms of the modified adhesive, which are subsequently brought into comminuted form. As for example, the adhesive may be ground to a relatively coarse mesh, such as any of the meshes within the range of 8 to 20. However, coarser or finer grindings may be prepared according to their intended use.

The amount of filler or modifier of the characteristics set forth in this invention that is present in the adhesive may be varied within rather wide limits. In other words, the modified adhesive in dry form may be made up to contain the amount of filler or modifier that it is desired to use in the final adhesive coating composition, which composition may be made up by soaking in water and heating in the conventional way, or the modified dry adhesive may contain an excess of fillers or modifiers and be mixed with unmodified glue at the time of the coating operation to form a composition having the amount of filler and modifier that it is desired to use in the coating operation.

It will be appreciated that my fillers or modifiers should be of a nature to impart to many organic adhesives the characteristics heretofore set forth. Preferred fillers or modifiers are normally inorganic materials and include, among other things, the metallic oxides and salts including the complex silicates having the characteristics described. Furthermore, my fillers or modifiers have a critical range of average surface diameter and the particles are of variable size, as previously set forth. My fillers or modifiers have a different average surface diameter range from that of the preferred fillers of the prior art such, for example, as the better or true paint pigments, many high grade rubber fillers, and many fillers heretofore used in synthetic resins to form objects by molding operations.

As previously pointed out, my fillers or modifiers are not pulverized, that is, of a size associated with dust, and are of different particle size from such high grade fillers of the prior art as carbon black, bone black, zinc oxide, titanium oxide, zinc sulphide, white lead and other well known pigments and fillers. In the prior art, extreme subdivision has been considered an important characteristic, whereas fillers or modifiers, even though made of otherwise satisfactory materials, are unsatisfactory for my purposes if sub-divided to a size associated with the small particle sizes of high grade paint pigments.

In each instance, the filler or modifier having the characteristics above related and a critical particle size range when used as described herein, is effective to provide an adhesive which may be readily coated upon a backing as a making coat or over abrasive grains as a sizing coat, and which on drying is effective to form a strong bond for the abrasive grit which is hard, especially at sanding temperatures, resistant to elevated temperatures, and particularly in the case of glue, resistant to moisture, which has heretofore caused objectionable softness in the bond. Further, in the case of the glue bond coated abrasives, the products are resistant to deterioration in storage as a result of the smaller coefficient of expansion and contraction of the adhesive under the influences of changes in atmospheric moisture.

I claim:

1. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing and another of which is superimposed on and among the grains as a sizing coat, at least one of the layers of the organic adhesive being modified by a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns.

2. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing, and another of which is superimposed on and among the grains as a sizing coat, at least the outer or top sizing coat of the organic adhesive being modified by a substantial percent by volume of an inert relatively non-absorbent, relatively non-fibrous filler, said filler being in a comminuted state and having an average surface diameter in the range of substantially 7 to 28 microns.

3. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing, and another of which is superimposed on and among the grains as a sizing coat, at least a sizing coat of the organic adhesive being modified by and containing substantially 35 to 55 percent by volume of an inert relatively non-absorbent, relatively non-fibrous filler, said filler being in a comminuted state and not more than substantially 35 percent by weight of said filler remaining on a 270 mesh screen having a mesh opening of 53 microns and the finer not less than about 65 per cent by weight of said filler which passes the said screen having an average surface diameter in the range of substantially 5.5 to 40 microns.

4. A coated abrasive comprising a flexible backing element, a coating of abrasive grains anchored thereon by an adhesive bond of animal glue, said adhesive bond comprising layers, one of which anchors the abrasive grain coating to the backing, and another of which is superimposed on and among the grains as a sizing coat, at least a sizing coat of the animal glue adhesive being modified by a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than about 65 percent by weight of said filler which passes the said screen having an average surface diameter in the range of substantially 5.5 to 40 microns, the filler or modifying agent being present in the binder layers within the range of about 25 to 55 percent by volume as determined by composite analysis of all of the binder layers, and said animal glue being tanned to impart moisture resistance to the same without deleteriously affecting the adhesive bond between the binder and the abrasive grains.

5. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing and another of which is superimposed on and among the grains as a sizing coat, at least the outer or top sizing coat of the organic adhesive being modified by a substantial percent by volume of an inert, relatively hard, relatively dense, relatively inelastic, relatively non-deformable, relatively non-absorbent, relatively non-fibrous filler, said filler being in a comminuted state, the particles being of variable size and having an average surface diameter in the range of substantially 7 to 28 microns, the said filler or modifying agent being present in the binder within the range of about 25 to 55% by volume as determined by composite analysis of all of the binder layers.

6. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing and another of which is superimposed on and among the grains as a sizing coat, at least a sizing coat of organic adhesive being modified by a substantial percent by volume of an inert relatively hard, relatively dense, relatively inelastic, relatively non-deformable, relatively non-fibrous filler, said filler being in a comminuted state, the particles of said filler being of variable size and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, the said filler or modifying agent being present in the binder within the range of about 25 to 55 percent by volume as determined by composite analysis of all of the binder layers.

7. A coated abrasive comprising a flexible backing element, a coating of abrasive grains anchored thereon by a synthetic resinous bond, said adhesive bond comprising layers, one of which anchors the abrasive grain coating to the backing and another of which is superimposed on and among the grains as a sizing coat, at least a sizing coat of synthetic resinous adhesive being modified by a substantial precent by volume of an inert, relatively hard, relatively dense, relatively inelastic, relatively non-deformable filler, said filler being in a comminuted state, the particles of said filler being of variable size and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, the said filler or modifying agent being present in the binder within the range of about 25 to 55 percent by volume as determined by composite analysis of all of the binder layers.

8. A coated abrasive comprising a flexible backing element, a coating of abrasive grains anchored thereon by an animal glue adhesive bond, said adhesive bond comprising layers, one of which anchors the abrasive grain coating to the backing and another of which is superimposed on and among the grains as a sizing coat, at least a sizing coat of animal glue adhesive being modified by a substantial per cent by volume of an inert, relatively hard, relatively dense, relatively inelastic, relatively non-deformable, relatively non-fibrous filler, said filler being in a comminuted state, the particles of said filler being of variable size and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, the said filler or modifying agent being present in the binder within the range of about 25 to 55 percent by volume as determined by composite analysis of all of the binder layers.

9. A relatively stiff but flexible abrasive disc adapted for use on a yielding supporting pad, on which the disc is secured at the center only, comprising a relatively stiff but flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing and another of which is superimposed on and among the grains as a sizing coat, at least a sizing coat of the organic adhesive being modified by a substantial percent by volume of an inert, relatively non-absorbent, relatively non-fibrous filler, said filler being in a comminuated state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns.

10. A coated abrasive comprising a backing, a making coat of abrasive grit-bonding organic adhesive selected from a group consisting of synthetic resins and animal glues coated on said backing, a layer of abrasive grit adhered to the backing by said making coat, and a sizing coat of abrasive grit-bonding organic adhesive selected from a group consisting of synthetic resins and animal glues coated upon and between the grit, at least the sizing coat including an inorganic filler in a comminuted state and not more than substantially 35 percent by weight of the filler remaining on a 270 mesh screen having a mesh opening of 53 microns and the finer not less than substantially 65 percent by weight of said filler which passes the said screen having an average surface diameter in the range of substantially 5.5 to 40 microns, said filler being present within the range of about 25 to 55% by volume as determined by composite analysis of all the binder layers and increasing the hardness of the adhesive at sanding temperatures and increasing the heat resistance of the adhesive.

11. A coated abrasive comprising a backing, a making coat of abrasive grit-bonding organic adhesive selected from a group consisting of synthetic resins and animal glues coated on said backing, a layer of abrasive grit adhered to the backing by said making coat, and a sizing coat of abrasive grit-bonding organic adhesive selected from a group consisting of synthetic resins and animal glues coated upon and between the grit, at least the sizing coat including an inorganic filler in a comminuted state having an average surface diameter in the range of substantially 7 to 28 microns, said filler being present within the range of about 25 to 55% by volume as determined by composite analysis of all the binder layers and increasing the hardness of the adhesive at sanding temperatures and increasing the heat resistance of the adhesive.

12. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing and another of which is superimposed on and among the grains as a sizing coat, at least a sizing coat of the organic adhesive being modified by a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns.

13. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grains to the backing and another of which is superimposed on and among the grains as a sizing coat, at least the outer or top sizing coat of the organic adhesive being modified by and containing substantially 35 to 55 percent by volume of an inert, relatively non-absorbent, relatively non-fibrous filler, said filler being in a comminuted state and having an average surface diameter in the range of substantially 7 to 28 microns.

14. A coated abrasive comprising a flexible backing element, a coating of abrasive grains anchored thereon by an abrasive grit-bonding organic adhesive selected from a group consisting of synthetic resins and animal glues, said adhesive bond comprising layers, one of which anchors the abrasive grains to the backing and another of which is superimposed on and among the grains as a sizing coat, at least the outer or top sizing coat of the organic adhesive being modified by and containing substantially 35 to 55 percent by volume of an inert, relatively non-absorbent, relatively non-fibrous filler, said filler being in a comminuted state and having an average surface diameter in the range of substantially 7 to 28 microns, the said filler or modifying agent being present within the range of about 25 to 55 percent by volume of all the grit-holding binder layers, as determined by a composite analysis of all of the said binder layers.

15. A relatively stiff but flexible abrasive disc adapted for use on a yielding supporting pad, on which the disc is secured at the center only, comprising a relatively stiff but flexible backing element, a coating of abrasive grains anchored thereon by an abrasive grit-bonding organic adhesive selected from a group consisting of synthetic resins and animal glues, said adhesive bond comprising layers, one of which anchors the abrasive grain coating to the backing and another of which is superimposed on and among the grains as a sizing coat, at least one of the layers of the organic adhesive being modified by a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns.

NICHOLAS E. OGLESBY.